(12) United States Patent
Munoz-Bustamante et al.

(10) Patent No.: US 6,259,840 B1
(45) Date of Patent: Jul. 10, 2001

(54) PRINTED CIRCUIT BOARD HAVING FLUID-LINKED OPTICAL PATHWAYS FOR COUPLING SURFACE MOUNTED OPTOELECTRIC SEMICONDUCTOR DEVICES

(75) Inventors: Carlos Munoz-Bustamante, Durham; Daniel McConnell, Raleigh, both of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,282

(22) Filed: Mar. 31, 1999

(51) Int. Cl.$^7$ .................................................. G02B 6/26
(52) U.S. Cl. ................... 385/39; 385/14; 385/31
(58) Field of Search .................. 385/39, 15, 27, 385/31, 51, 73, 76, 53, 55, 52, 61, 66, 88–94, 95, 97, 98, 115, 121, 137, 139, 143, 145, 141, 4

(56) References Cited

U.S. PATENT DOCUMENTS

| | | |
|---|---|---|
| 4,720,634 | 1/1988 | D'Auria et al. . |
| 4,732,446 | 3/1988 | Gipson et al. . |
| 4,838,630 | 6/1989 | Jannson et al. . |
| 5,093,879 | 3/1992 | Bregman et al. . |
| 5,093,890 | 3/1992 | Bregman et al. . |
| 5,096,279 | 3/1992 | Hornbeck et al. . |
| 5,283,447 | 2/1994 | Olbright et al. . |
| 5,307,438 | * 4/1994 | Bilkadi et al. ................ 385/141 |
| 5,392,372 | * 2/1995 | Kurata et al. ................. 385/88 |
| 5,404,373 | 4/1995 | Cheng . |
| 5,422,901 | 6/1995 | Lebby et al. . |
| 5,552,924 | 9/1996 | Tregilgas . |
| 5,572,540 | 11/1996 | Cheng . |
| 5,673,284 | 9/1997 | Congdon et al. . |
| 5,708,280 | 1/1998 | Lebby et al. . |
| 5,789,733 | 8/1998 | Jackimowicz et al. . |

* cited by examiner

Primary Examiner—Frank G. Font
Assistant Examiner—Michael P. Mooney
(74) Attorney, Agent, or Firm—George E. Grosser; Andrew Dillion

(57) ABSTRACT

A printed circuit board for coupling surface mounted optoelectric semiconductor devices within a computer system is disclosed. The printed circuit board includes at least one substantially planar surface. There are multiple electrically conductive sites located on the substantially planar surface for connection to a surface mounted semiconductor electronic device. The electrically conductive sites are also connected to electrical interconnects embedded within the printed circuit board. In addition, there are multiple optical pathways terminated at the substantially planar surface. A droplet of viscous fluid is placed at each of the optical pathways terminated at the substantially planar surface in order to provide better coupling between a surface mounted semiconductor optoelectric device and the printed circuit board.

14 Claims, 5 Drawing Sheets

PRINTED CIRCUIT BOARD HAVING FLUID-LINKED OPTICAL PATHWAYS FOR COUPLING SURFACE MOUNTED OPTOELECTRIC SEMICONDUCTOR DEVICES

BACKGROUND OF THE INVENTION

1. Technical Field

The present invention relates to printed circuit boards in general, and in particular to a printed circuit board to be utilized in an optoelectric data processing system. Still more particularly, the present invention relates to an improved printed circuit board for coupling surface mounted semiconductor optoelectric devices.

2. Description of the Prior Art

Within most computer systems, a bus (or a group of buses) is typically the primary vehicle by which communication among electronic components takes place. Although there are different types of buses, in its most basic form, each bus is simply a series of electrical wires interconnecting various electronic components within a computer system. The electrical transmission characteristics of a bus are defined by the material properties of the bus, the physical geometry of the components, the clock speed of the signals, and the noise within the bus. Thus, both the limitations in materials and the limitations in electronic components contribute to the electrical transmission characteristics of a bus.

As computer systems become more complex, there is a continuing need to drive signals within a bus at a faster clock rate while at the same time minimizing power, noise, and electromagnetic interference. Most if not all of these requirements are satisfied by optoelectric computer systems. An optoelectric computer system is a computer system in which digital data signals are transmitted in both electrically conductive buses and optical buses (or pathways). Such a computer system may, for example, utilize semiconductor devices that have vertical cavity surface emitting lasers (VCSELs) serving as transducers for optoelectric exchange. One such semiconductor device that is now in commercial use is the HFBR-5303 VCSEL transceiver manufactured by Hewlett Packard™.

With a printed circuit board having optical pathways, it is important to ensure that optoelectric devices, as they are mounted on the printed circuit board, are sufficiently aligned with the optical pathways in order to provide reliable operation even if the optoelectric computer system is subject to vibration or shock that would otherwise shift the optoelectric devices out of alignment. Further, there may arise a need to accommodate for non-ideal alignment situations between optoelectric devices and optical pathways during manufacturing. In order to eliminate the above-mentioned problems, the present invention provides an improved method for coupling surface mounted optoelectric semiconductor devices on a printed circuit board.

SUMMARY OF THE INVENTION

In accordance with a preferred embodiment of the present invention, a printed circuit board includes at least one substantially planar surface. There are multiple electrically conductive sites located on the substantially planar surface for connection to a surface mounted semiconductor electronic device. The electrically conductive sites are also connected to electrical interconnects embedded within the printed circuit board. In addition, there are multiple optical pathways terminated at the substantially planar surface. A droplet of viscous fluid is placed at each of the optical pathways terminated at the substantially planar surface in order to provide better coupling between a surface mounted semiconductor optoelectric device and the printed circuit board.

All objects, features, and advantages of the present invention will become apparent in the following detailed written description.

DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DESCRIPTION OF A PREFERRED EMBODIMENT

Figure 1:
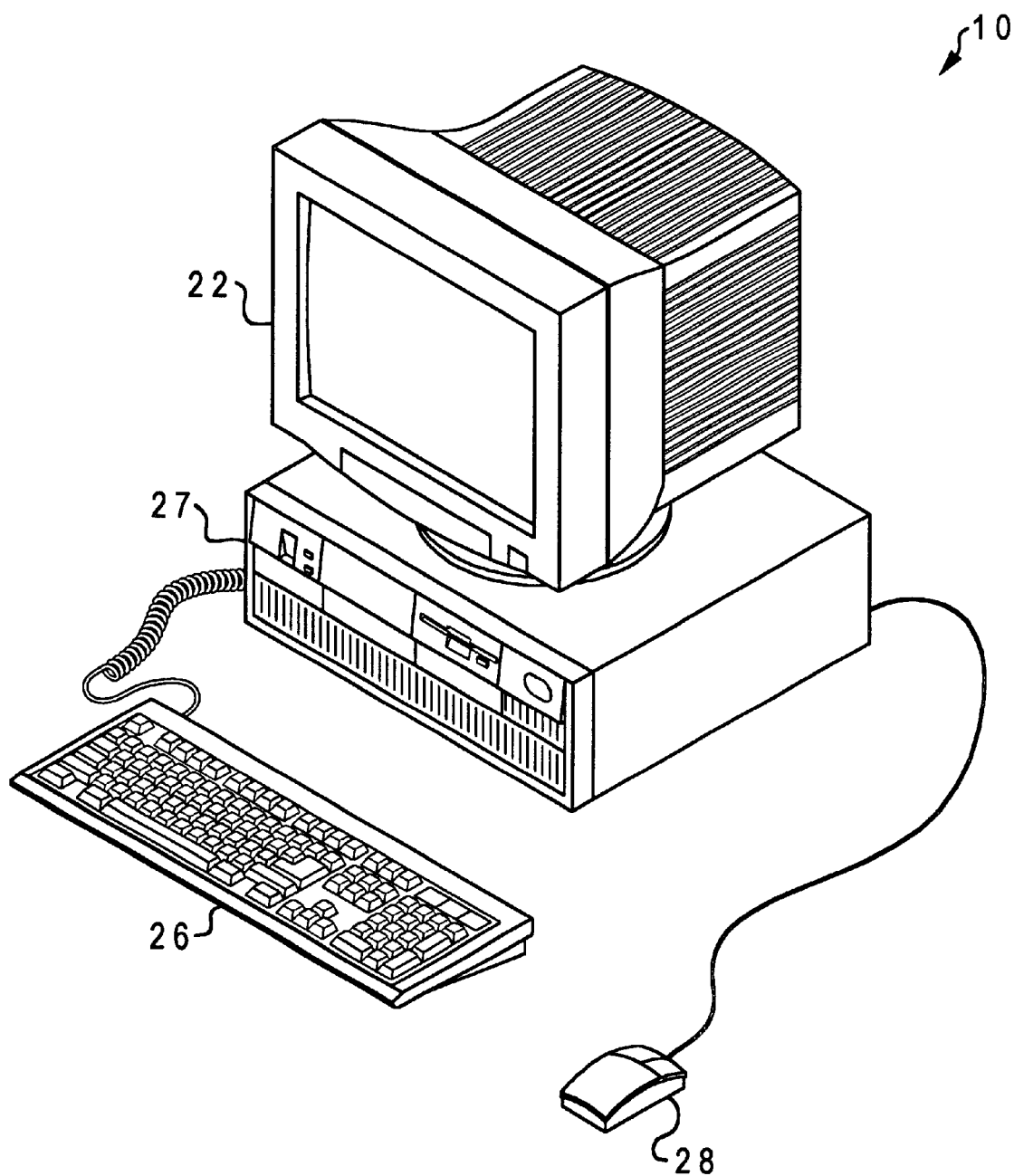
FIG. 1 is a pictorial view of an optoelectric computer system to which a preferred embodiment of the present invention is applicable.
Figure 2:
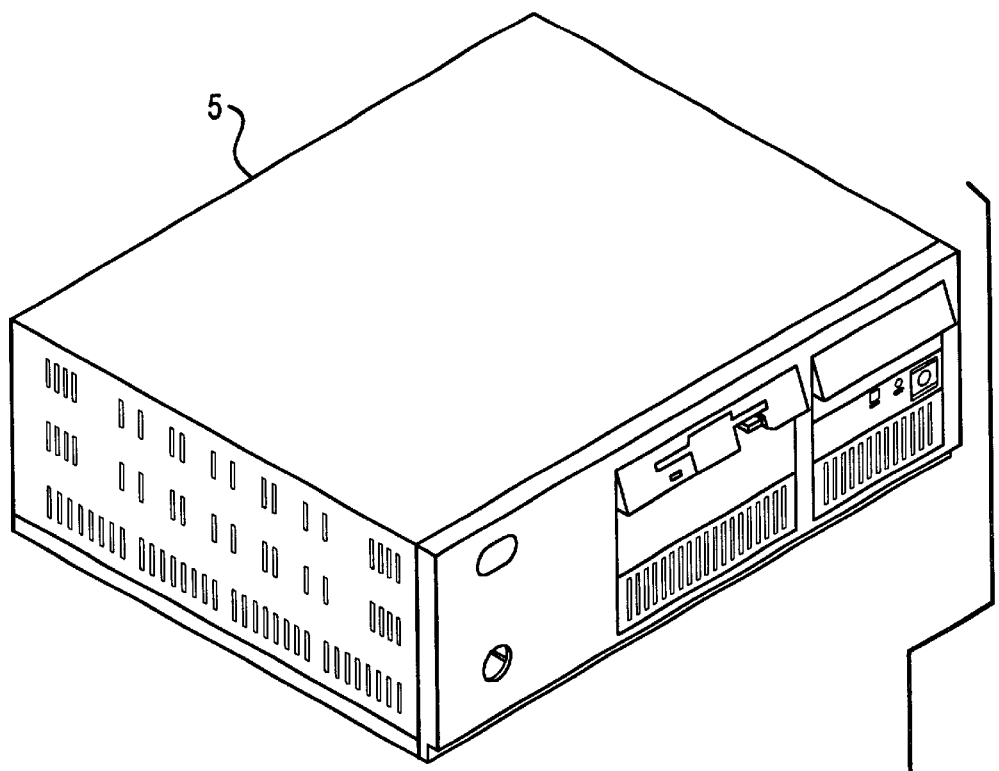
FIG. 2 is an exploded perspective view of various elements within the optoelectric computer system from FIG. 1.
Figure 2:
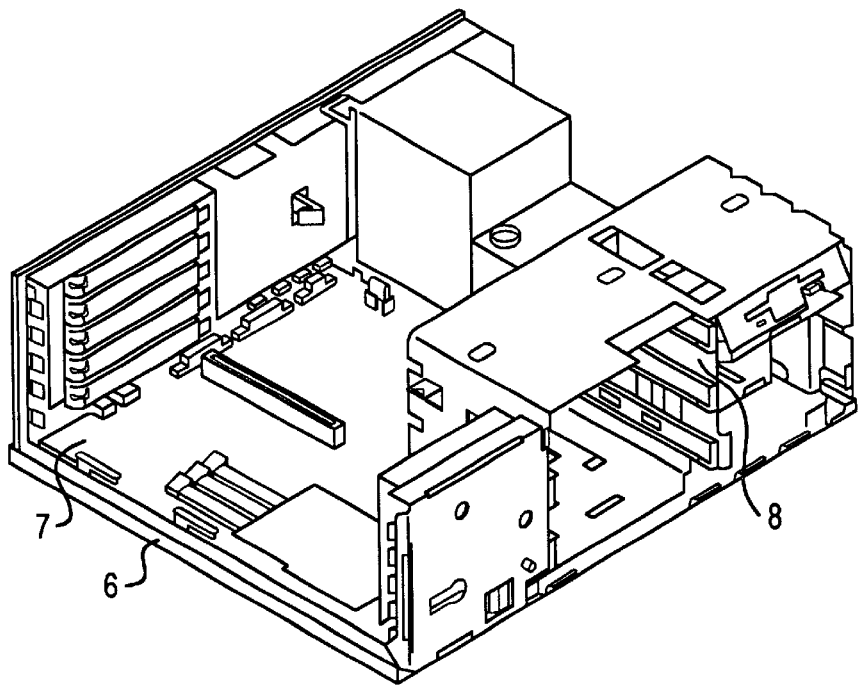

Referring now to the drawings and in particular to FIG. 1, there is depicted a block diagram of an optoelectric computer system to which a preferred embodiment of the present invention is applicable. An optoelectric computer system 10 includes a computer unit 27, a monitor 22, a keyboard 26, and a mouse 28. As shown in FIG. 2, computer unit 27 has a cover 5 that cooperates with a chassis 6 in defining an enclosed, shielded volume for receiving electrically powered data processing components. Some of the data processing components are mounted on a printed circuit board (or motherboard) 7 that is secured within chassis 6. Chassis 6 has a base and a rear panel and defines at least one open bay for receiving a data storage device such as a magnetic disk drive, an optical disk drive, or the like. As shown, an upper bay 8 is adapted to receive a floppy disk drive (not shown).

Figure 3:
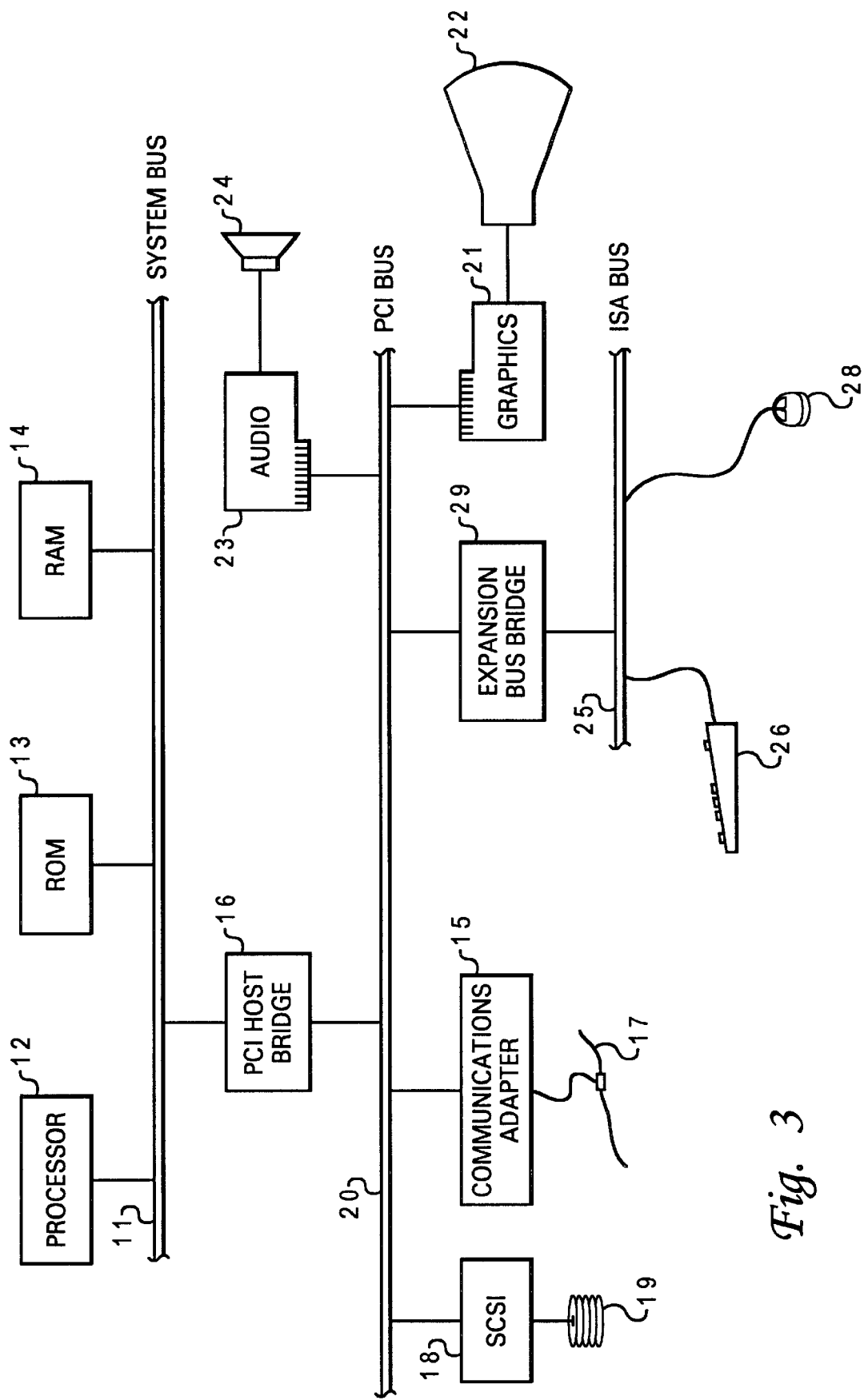
FIG. 3 is a block diagram of various elements of the optoelectric computer system from FIG. 1.

Referring now to FIG. 3, there is illustrated a block diagram of various components within optoelectric computer system 10, including components mounted on printed circuit board 7 and the connection of printed circuit board 7 to the I/O slots. As shown, a processor 12, a read-only memory (ROM) 13, and a Random Access Memory (RAM) 14 are connected to a system bus 11. Processor 12, ROM 13, and RAM 14 are also coupled to a PCI bus 20 of optoelectric computer system 10 through a PCI host bridge 16. PCI host bridge 16 provides a low latency path through which processor 12 may directly access PCI devices mapped anywhere within bus memory and/or I/O address spaces. PCI host bridge 16 also provides a high bandwidth path allowing PCI devices to directly access RAM 14.

Also attached to PCI bus 20 is a communications adapter 15 and a small computer system interface (SCSI) 18. Communications adapter 17 connects optoelectric computer system 10 to a local-area network (LAN) 17. SCSI 18 is utilized to control a high-speed SCSI disk drive 19. Expansion bus bridge 29, such as a PCI-to-ISA bus bridge, may be utilized for coupling an ISA bus 25 to PCI bus 20. As shown, keyboard 26 and mouse 28 are attached to ISA bus 25 for performing certain basic I/0 functions. In addition, an audio adapter 23 and a graphics adapter 21 may be attached to PCI bus 20. Graphics adapter 21 controls visual output through monitor 22 and audio adapter 23 controls audio output through a speaker 24.

Figure 4:
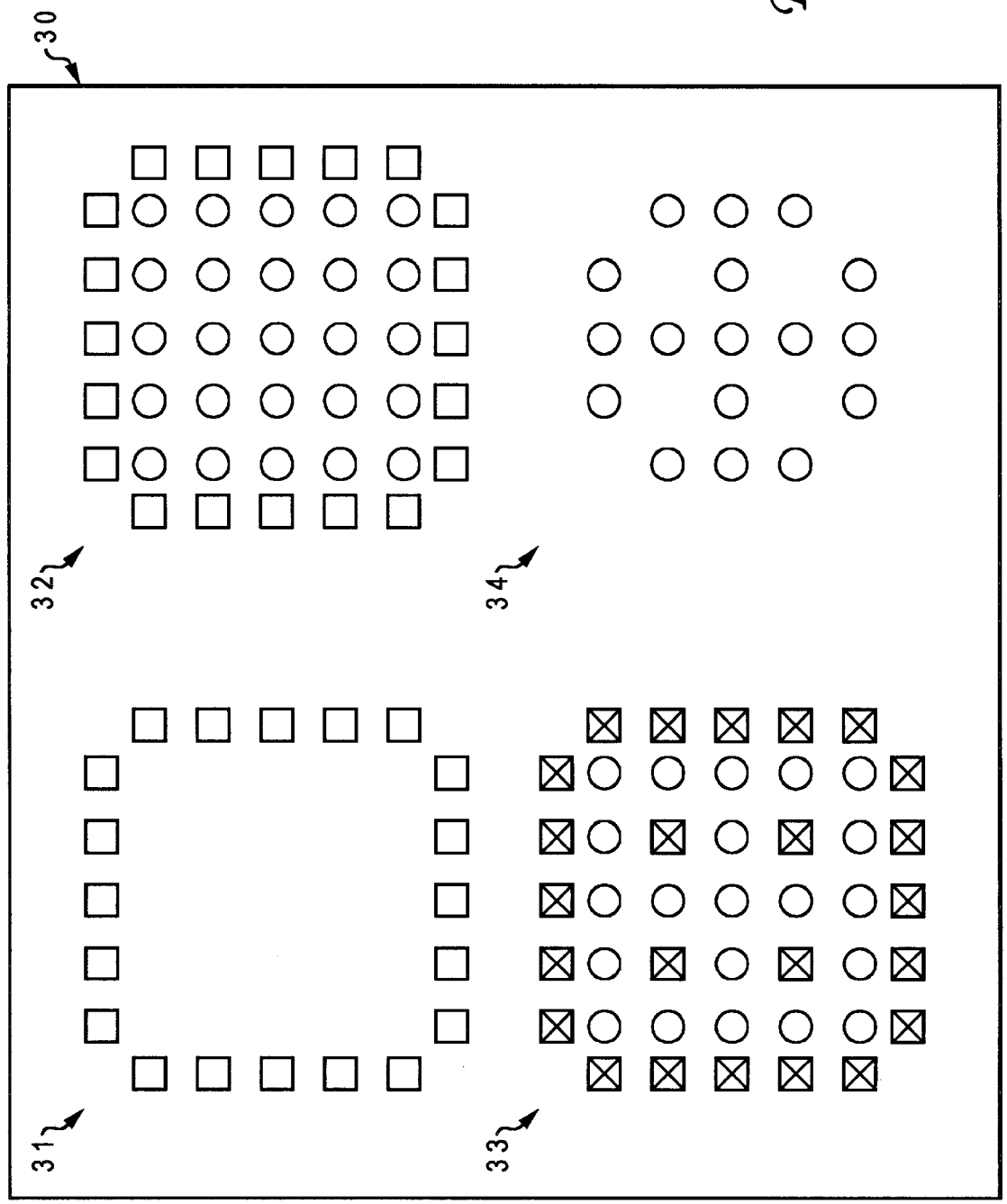
FIG. 4 is a plan view of a printed circuit board used in the optoelectric computer system from FIG. 1.

With reference now to FIG. 4, there is illustrated a top plan view of printed circuit board 7 used in optoelectric computer system 10 of FIG. 1, in accordance with a preferred embodiment of the present invention. For the purpose of illustration, there are only four mounting sites—mounting sites 31–34—included on printed circuit board 7. Each of mounting sites 31–34 is designed to receive a different type of electronic or optoelectric devices. In FIG. 4, each square represents an electrically conductive site located on the surface of printed circuit board 7, each square having an "x" represents an electrically conductive via on printed circuit board 7, and each circle represents an optical pathway terminated at the surface of printed circuit board 7. As shown, mounting site 31 is designed to receive a standard surface mounted electronic device. Each square is a location where a J-lead of a surface mounted electronic device connected to printed circuit board 7. All of mounting sites 32, 33, and 34 are designed to receive an optoelectric device. Mounting site 32 is designed to receive a surface mounted optoelectric device having optical pathways in the bottom surface and surface mounted electrical connections on the edges of the device. Mounting site 33 is designed to receive an optoelectric device having both optical pathways and electrical pin connections at the bottom surface of the device. Mounting pad 34 is intended for a surface mounted optoelectric device having only optical pathways located at the bottom surface of the device, and the surface mounted optoelectric device can be secured to printed circuit board 7 by a convention adhesive.

Figure 5B:
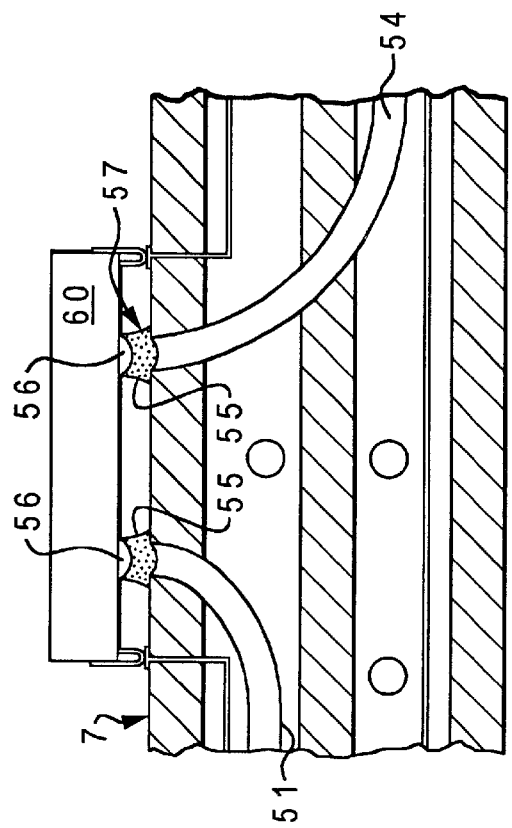
FIGS. 5a and 5b are section views of a surface mounted optoelectric device coupled to the printed circuit board from FIG. 4, in accordance with a preferred embodiment of the present invention.
Figure 5A:
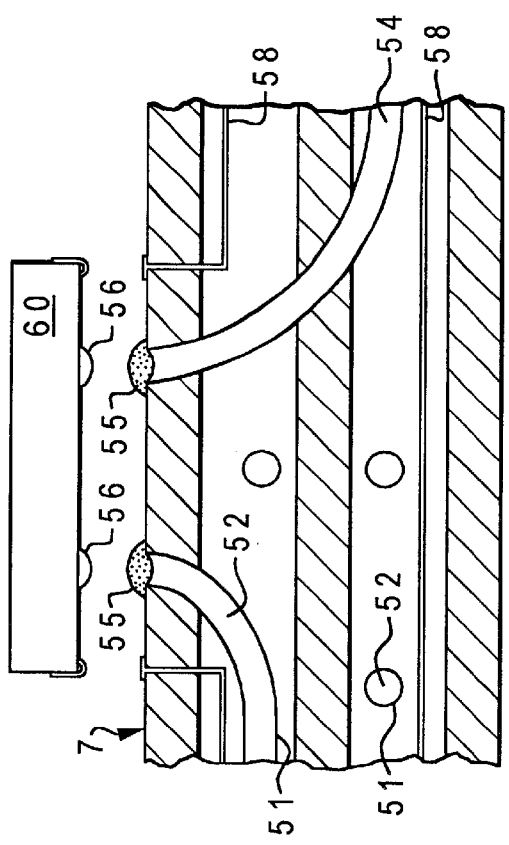

Referring now to FIG. 5a, there is illustrated a section view of printed circuit board 7 in accordance with a preferred embodiment of the present invention. As shown, printed circuit board 7 is a three layer laminated board, though more layers can be added. Electrical interconnects 58 are embedded within printed circuit board 7 for the transmission of electrical signals. In addition, optical fibers 51 are embedded within printed circuit board 7 and form an optical pathway 52 for the transmission of optical data. Optical data can be transmitted to optical fibers 51 from a data source by means of a fiber optic bundle (not shown). The fiber optic bundle interfaces with optical fibers 51 embedded within printed circuit board 7 by means of an optical connector (not shown).

As a preferred embodiment of the present invention, a droplet of viscous fluid is deposited on the surface of printed circuit board 7 at a location at which an embedded fiber optic cable terminated. For example, viscous fluid droplets 55 are deposited at the terminations of fiber optic cables 51, 54. Preferably, the viscous fluid has a refractive index of approximately the same as the refractive index of the optical pathway and the optical lens of surface mounted optoelectric device 60. But more importantly, the viscous fluid should have a refractive index that is substantially transparent to the wavelength of the optical signals. Thus, for most applications, the relative refractive index of the viscous fluid is preferably in the range of 1.5 to 2.0. The viscosity of the viscous fluid should provide a surface tension strong enough to retain a drop of the fluid in place even during and after an occurrence of an optical misalignment. The relative viscosity of the viscous fluid should preferably be at least 5.0 or above. One of the viscous fluids that meets all of the above-mentioned requirements is Glycerol.

After the deposition of the viscous fluid, a surface mounted optoelectric device 60 having optical lens 56 on the bottom of its package can be mounted in place. With the placement of surface mounted optoelectric device 60 on printed circuit board 7, each optical lens 56 contacts a respective viscous fluid droplet 55. The surface tension of viscous fluid droplets 55 causes the viscous fluid droplets 55 to encompass optical lenses 56 to complete the optical connection between surface mounted optoelectric device 60 and printed circuit board 7, as shown in FIG. 5b. Although the shape of the exterior surface of each viscous fluid droplet 55 following connection of lens 56 and printed circuit board 7 can be concave, convex, or flat; however, a concave shape such as arc 57 is more preferable because the concave shape tends to hold viscous fluid droplets 55 in place better.

In addition, a hole functioning as an optical node on printed circuit board 7 can likewise be filled with a viscous fluid to provide further assistance in the transmission of optical signals to and from the surface of printed circuit board 7. An optical node is a point on printed circuit board 7 where multiple fiber optic cables join for the purpose of transmitting a common optical signal.

As has been described, the present invention provides an improved printed circuit board for receiving surface mounted optoelectric semiconductor devices. The printed circuit board includes both optical pathways and electrical interconnects, and the optical pathways are terminated at a surface of the printed circuit board in order to accommodate surface mounted optoelectric semiconductor devices. According to the present invention, a droplet of viscous fluid is utilized to couple the surface mounted optoelectric device and the optical pathways. The viscous liquid has a refractive index of approximately, to the degree attainable, the refractive index of the optical pathway and the lens of the surface mounted optoelectric device. The viscosity of the viscous fluid is such as to provide a surface tension that is strong enough to retain the drop of viscous fluid in place during an occurrence of an optical misalignment. This surface tension should be sufficient to ensure retention of the viscous regardless of whether the optical connection point is concave or convex. The present invention assures that alignment is sufficiently precise for functionality. Additionally, the present invention enables accommodation of vibration or shock induced movement of mounted devices and of optical misalignment. Thus, where a via serves as a linkage point between an optical pathway and an optoelectric device, the present invention enables transfer of optical signals across an interface even with substantial angular misalignment.

While the invention has been particularly shown and described with reference to a preferred embodiment, it will be understood by those skilled in the art that various changes in form and detail may be made therein without departing from the spirit and scope of the invention.

What is claimed is:

1. A printed circuit board, comprising:

at least one substantially planar surface;

a plurality of optical pathways terminated at said at least one substantially planar surface; and a droplet of viscous fluid placed at each of said plurality of optical pathways terminated at said at least one substantially planar surface in order to provide coupling between a surface mounted semiconductor optoelectric device and said printed circuit board.

2. The printed circuit board according to claim 1, wherein said viscous fluid has a relative refractive index in the range of 1.5 to 2.0.

3. The printed circuit board according to claim 1, wherein said viscous fluid has a relative viscosity of at least 5.0.

4. The printed circuit board according to claim 1, wherein said viscous fluid is Glycerol.

5. The printed circuit board according to claim 1, wherein said printed circuit board further includes:
- a plurality of electrical interconnects; and
- a plurality of electrically conductive sites located on said at least one substantially planar surface for connection to a surface mounted semiconductor electronic device, wherein said plurality of electrically conductive sites are connected to said plurality of electrical interconnects.

6. A computer system, comprising:
- a plurality of electronic and optoelectric devices; and
- a printed circuit board in which said plurality of electronic and optoelectric device are mounted, wherein said printed circuit board includes:
  - at least one substantially planar surface;
  - a plurality of optical pathways terminated at said at least one substantially planar surface; and
  - a droplet of viscous fluid placed at each of said plurality of optical pathways terminated at said at least one substantially planar surface in order to provide coupling between a surface mounted semiconductor optoelectric device and said printed circuit board.

7. The computer system according to claim 6, wherein said viscous fluid has a relative refractive index in the range of 1.5 to 2.0.

8. The computer system according to claim 6, wherein said viscous fluid has a relative viscosity of at least 5.0.

9. The computer system according to claim 6, wherein said viscous fluid is Glycerol.

10. The computer system according to claim 6, wherein said printed circuit board further includes:
- a plurality of electrical interconnects; and
- a plurality of electrically conductive sites located on said at least one substantially planar surface for connection to a surface mounted semiconductor electronic device, wherein said plurality of electrically conductive sites are connected to said plurality of electrical interconnects.

11. A method for providing coupling between a surface mounted semiconductor optoelectric device and a printed circuit board, said method comprising the steps of:
- providing a printed circuit board having at least one substantially planar surface and a plurality of optical pathways terminated at said at least one substantially planar surface; and
- placing a droplet of viscous fluid at each of said plurality of optical pathways terminated at said at least one substantially planar surface; and
- positioning a surface mounted semiconductor optoelectric device having a plurality of optical lens such that each of said optical lens met with each of said droplets of viscous fluid previously placed on said printed circuit board.

12. The method according to claim 11, wherein said viscous fluid has a relative refractive index in the range of 1.5 to 2.0.

13. The method according to claim 11, wherein said viscous fluid has a relative viscosity of at least 5.0.

14. The method according to claim 11, wherein said viscous fluid is Glycerol.

* * * * *